US005786051A

United States Patent [19]

Niggemeier et al.

[11] Patent Number: 5,786,051

[45] Date of Patent: Jul. 28, 1998

[54] INK TRANSFER ROLLER WITH INTERCHANGEABLE COVER

[75] Inventors: Georg Niggemeier, Paderborn; Franz-Josef Driller, Borchen; Roland Brinkman, Paderborn, all of Germany

[73] Assignee: Kurt Zecher GmbH, Paderborn, Germany

[21] Appl. No.: 554,707

[22] Filed: Nov. 7, 1995

Related U.S. Application Data

[63] Continuation-in-part of Ser. No. 343,932, Nov. 17, 1994, abandoned.

[30] Foreign Application Priority Data

| | | | |
|---|---|---|---|
| Jul. 26, 1994 | [DE] | Germany | 44 26 485.2 |
| May 4, 1995 | [DE] | Germany | 195 16 032.0 |

[51] Int. Cl.[6] .................... B32B 1/08; B41N 7/06; B41F 31/26

[52] U.S. Cl. .................... 428/35.9; 428/36.1; 428/36.5; 428/909; 492/31; 492/53

[58] Field of Search .................... 428/35.9, 909, 428/36.1, 36.5; 492/30, 53

[56] References Cited

U.S. PATENT DOCUMENTS

| | | | |
|---|---|---|---|
| 3,467,009 | 9/1969 | Ross | 101/216 |
| 4,805,530 | 2/1989 | Kobler et al. . | |
| 5,001,821 | 3/1991 | Herb | 492/31 |

FOREIGN PATENT DOCUMENTS

| | | |
|---|---|---|
| 0577920 | 12/1994 | European Pat. Off. . |
| 3706011 | 9/1988 | Germany . |
| 1198863 | 7/1970 | United Kingdom . |

*Primary Examiner*—Kathleen Choi
*Attorney, Agent, or Firm*—Browdy and Neimark

[57] ABSTRACT

An ink transfer roller for a support roller or support bar, in particular of metal, with a stretchable, interchangeable fiber-reinforced laminated plastic material cover (K) covered with a metal-ceramic layer (MK), which is provided with small ink transfer cups (FN), wherein the laminated plastic material cover (K) consists of a stretchable inner cover (UB) and an outer cover (OB), between which a foamed material compressible layer (SS) is enclosed.

17 Claims, 3 Drawing Sheets

INK TRANSFER ROLLER WITH INTERCHANGEABLE COVER

This is a CIP of parent application Ser. No. 08/343,932, filed Nov. 17, 1994, now abandoned the contents of which are hereby incorporated by reference.

FIELD OF THE INVENTION

The present invention relates to an ink transfer roller especially for use with a support roller or support bar, in particular of metal, with a stretchable, interchangeable fiber-reinforced plastic laminated material cover in turn covered with a metal-ceramic layer, which is provided with small ink transfer cups.

BACKGROUND OF THE INVENTION

Prior-art ink transfer rollers having a cover over a metal roller have heretofore used a cover in the form of a cylindrical, one-piece body of laminated synthetic resin material equipped with fiberglass mat inserts, supporting on its surface a metal-ceramic layer with small ink transfer cups cut in by laser. This fiberglass-mat reinforced epoxy resin body is expanded by means of compressed air and pulled over the steel roller body and maintained there by elastic radial forces. However, after prolonged use the elastic tension relaxes because of the increased operating temperature, by reason of a flexing expansion of the plastic jacket.

However, corrosion of the surface of the metal roller can be caused by the penetration of printing ink and an excursion of the cover can take place, which in particular drastically worsens the ink transfer quality and is therefore unacceptable. In addition, the synthetic resin surface which had been ground and polished before being ceramized has tiny pores where the glass fibers were cut on the surface, sources of incipient corrosion.

Ink transfer rollers with layers made of a metallic matrix with an insert material of a mechanically resistant metal-ceramic material, for example nickel-silicon carbide, are known, which have a very high stability of the laser-cut small ink transfer cups.

One such ink transfer roller is known, for instance, from German Patent Disclosure DE 40 07 130 A1. In it, cups are impressed into a metal surface, and a burr created in the process is removed. To increase the abrasion resistance, the cup surface is galvanically coated with hard material such as hard chromium, or with particles of silicon carbide embedded in a nickel matrix; an additional, thin layer of hard chromium can be applied over this. However, these upper layers are always shot through with fine microscopic cracks, and fine pores in the micrometer range can be found especially in the boundaries of the inlaid particles of hard material, resulting in only limited adhesion thereof.

Inking rollers are also known from the journal Flexo, 1985, Vol. 10, No. 10, pp. 45–50, whose cups are laser-cut into a plasma-sprayed hard ceramic layer, such as chromium oxide, $Cr_2O_3$. Spotwise high-temperature treatment with the laser beam and the ensuing rapid cooling result in microscopic cracks, microscopic pores, and major distortions and strains in the microstructure, which lessens the abrasion resistance and corrosion resistance.

SUMMARY OF THE INVENTION

Objects of the invention are to overcome deficiencies in the prior art, such as indicated above; and to improve the service life and stability of the ink transfer roller. These objects are attained by providing a cover of plastic laminated material which consists of a stretchable inner cover and an outer cover, between which a layer of foamed material is enclosed.

By means of the elastic interlayer, the essentially three-layered embodiment of the plastic cover prevents a transfer of the flexing motion to the inner cover which, because of this, always adheres tightly and solidly to the support roller. Furthermore, the stretching by means of compressed air which is applied from the interior to the inner cover is intercepted by the foamed material and is kept away to a large degree from the relatively brittle metal-ceramic layer, which reduces the creation of micro-tears therein.

Furthermore, the cover does not contain glass fibers, particularly not at the surface, so that prior to ceramizing no corrosion centers and micropores are present on the polished, preferably plasma-polished, surface.

According to the present invention, layer with a circular and axis-parallel extension of the fibers, made of a microfiber-polyester fabric, has shown itself to be especially advantageous as the insert material for the inner cover, which therefore has sufficient stretchability with high stability of shape. A fabric with approximately 15×15 flat aramid (aromatic polyamide, e.g. KEVLAR"*w of Dupont) threads has proven to be advantageous for the insert; polyester can also be used. The softening point of this fabric lies above 120° C., so that the heat treatment during curing of the polyester resin, during plasma injection as well as during operation in the printing presses, does not leave a permanent deformation.

The plastic web layers in the inner and outer covers are made of long-fiber plastic threads and are each of approximately 0.5 mm thickness. They are soaked with the synthetic resin, the same as the fabric, and wound on top of each other and then cured. After the inner cover has cured, the foamed material layer is wound on it and is then wrapped with the synthetic resin-soaked webs of the outer cover and then cured, in the course of which the shrinking forces occurring during the process of solidification reduce the foamed material layer to approximately one-half its original volume, so that a steady radial tension keeps all three layers together.

The foam rubber layer is preferably made of temperature-stable, closed-cell polyurethane, polypropylene or polyamide, the density of which prior to installation is approximately 0.3 to 0.7 g/cm$^3$.

Alternatively the three-layered construction can also be created by layered extrusion of a thermoplastic material, for example polypropylene or polyamide, wherein the interlayer is foamed by means of a partial gas injection or by an expanding agent.

The outer layer is either made of a high-pressure plasma-injected metal-ceramic material, for example $Cr_2O_3$ of a thickness of a few tenths of a millimeter, and directly applied to the synthetic resin surface or to a metallic adhesive layer preferably consisting of a thin metallic layer, which is elastic and forms a moisture-sealed interlayer.

In place of a pure metal-ceramic layer it is also possible to apply a metallic matrix with embedded mechanically resistant materials. The known nickel-silicon carbide coating (a coating of silicon carbide particles embedded in nickel) has proven itself.

It has been shown to be advantageous for preventing corrosion from the direction of the ends to embody the outer cover and/or the inner cover with annular rims at the ends, which close off the ends of the ceramic layer in particular as well as the foamed material layer and prevent the infiltration by ink material and their solvents.

The ink transfer roller of the present invention may have a surface structure, made mechanically or by laser action, of ink transfer cups (or, wells) in a microporous, metallic or ceramic or metal-ceramic layer of hard material, and to a method for producing it.

Another object of the invention is to improve the ink transfer roller described at the outset in such a way that it has a longer service life, less wear, and less vulnerability to corrosion.

This object is attained in that superficial microscopic cracks and pores in the ceramic layer are closed by means of an ion implant material applied with a high-voltage plasma.

All the microstructured ink transfer rollers known until now are suitable for the treatment according to the invention with their surface with implant material, both in new production and in retrofitting. The layers of material applied in the implantation have, compared to the cup dimensions, a comparatively slight thickness of 1 to 2 μm, so that the cup volume remains virtually unchanged.

As materials for filling and closing the cracks and pores, combinations of quadrivalent substances with heavy metal have proven to be good, especially quadrivalent titanium and hexavalent molybdenum in a ratio by weight of 70/30 to 90/10, and is preferably 80/20. These metal ions penetrate deep into the interior of microscopic cracks and the boundary layer that often occur at the particle boundaries of electrolytically applied layers or sputtered layers, or after laser cutting. In particular, sealing and filling of the cracks increases the corrosion resistance, since the surface becomes smooth and dense.

The implantation of the metal ions is done in a nitrogen atmosphere, so that the metals partly form compounds in the form of nitrides and form very hard crystalline structures.

Advantageously, a further wear-resistant cover layer with a thickness of from 0.05 to 1 μm, and preferably 0.1 μm of a hard material is implanted in a similar way. Hard metal oxides or metal nitrides are contemplated for this purpose. Zirconium oxide ($ZrO_2$) has proven to be especially good, and for this reason, the implantation is done in an oxygen plasma. This cover layer is selected in particular such that a desired surface affinity with the printing ink to be transported and metered is brought about.

The implantations are done at high voltage with a turbulent flow of the plasma, preferably in nitrogen and/or oxygen. As the voltage, from 1000 to 10,000 V are applied, and the current intensity is selected such that with moderate heating, an adequate penetration depth of the ions and anchoring of the implant in the surface take place without burning or thermally destroying the surface.

By suitable control of the current intensity and of the high voltage, the operating heat is kept so low that no significant thermal strains arise in the layer near the surface, even after cooling down. Temperatures of from 50° to 80° C. are contemplated. As a result, even rollers such as those disclosed in U.S. patent application Ser. No. 08/343,932 can be hardened with an implant whose layer of hard material is supported by a plastic understructure. In particular, the layer of hard material is applied over a metal layer on an elastic plastic jacket, which comprises plastic reinforced with plastic fiber inlays, and which is interchangeably slipped, with an elastic understructure, onto a solid metal roller core.

The above and other objects and the nature and advantages of the present invention will become more apparent from the following detailed description of a preferred embodiment, taken with the drawing, wherein:

DETAILED DESCRIPTION OF THE PREFERRED EMBODIMENT

In the following Description and claims, the term "metal-ceramic" means ceramic material crystallized from oxides, carbides, and/or nitrides of heavy metals (defined as those metals heavier than Na), and excluding ceramic compounds of alkali and alkali-earth metals (i.e., Li, Na, K, Rb, Cs, Fr, Be, Mg, Ca, Sr, Ba, and Ra).

In the following description and claims, "matrix" or "metallic/particle matrix" means a metallic/particle matrix containing hard particles such as for example ceramic particles, i.e. a composite of metal and hard particles.

Figure 1:
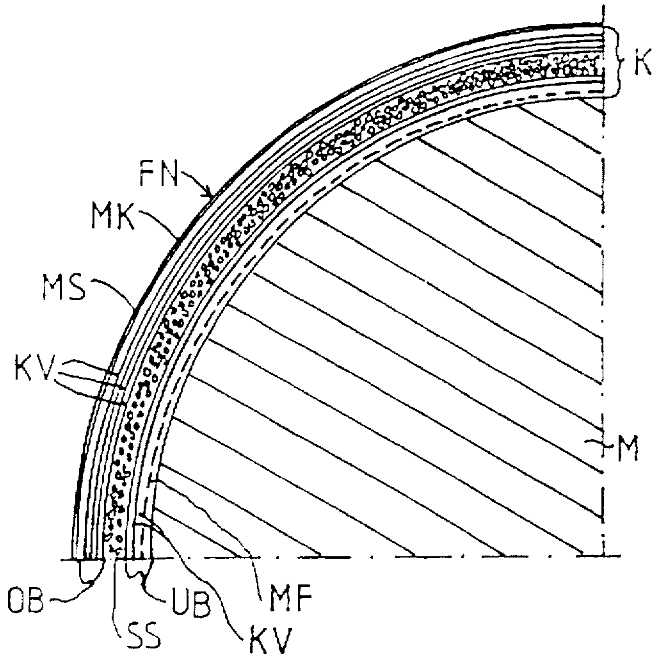
FIG. 1 is a cross-sectional view taken on a plane perpendicular to the axis of a roller, i.e., showing a cut-out of a sector of a radial cut of the roller.

FIG. 1 shows a portion of a radial section. The plastic laminated material cover (K) has been drawn over the metallic support roller (M) or a support arbor and is held by elastic radial forces. A thin metal-ceramic layer (MK) has been applied on the exterior by means of high-pressure plasma-extrusion, into which small ink transfer cups have been cut by laser in a known manner.

The plastic laminated material cover (K) consists of an inner cover (UB) of a synthetic resin laminated material containing a micro-fiber textile layer (MF) of polyester micro-fibers with circular/axial extension of the fibers and contains further synthetic fiber web layers (KV). The thickness of the inner layer (UB) is between 2 to 7 mm, preferably 3 mm.

The inner cover (UB) is wound in a foamed material layer (SS), the thickness of which is between 2 to 7 mm, preferably 4 mm when installed.

The outer cover (OB) of plastic fiber web layers with synthetic resin bonding is embodied over the foamed material layer (SS). That is, the layers UB and OB are preferably made from a synthetic plastic (or resin) fiber web which is stabilized (laminated) in synthetic resin material. The metal-ceramic layer (MK) is applied to the ground and polished surface, if necessary by means of an adhesive layer, a metallic interlayer (MS) The outer cover (OB) is preferably between 2 to 7 mm thick, in particular 3 mm. Around the entire cover (K) has a thickness of approximately 10 mm.

Figure 2:
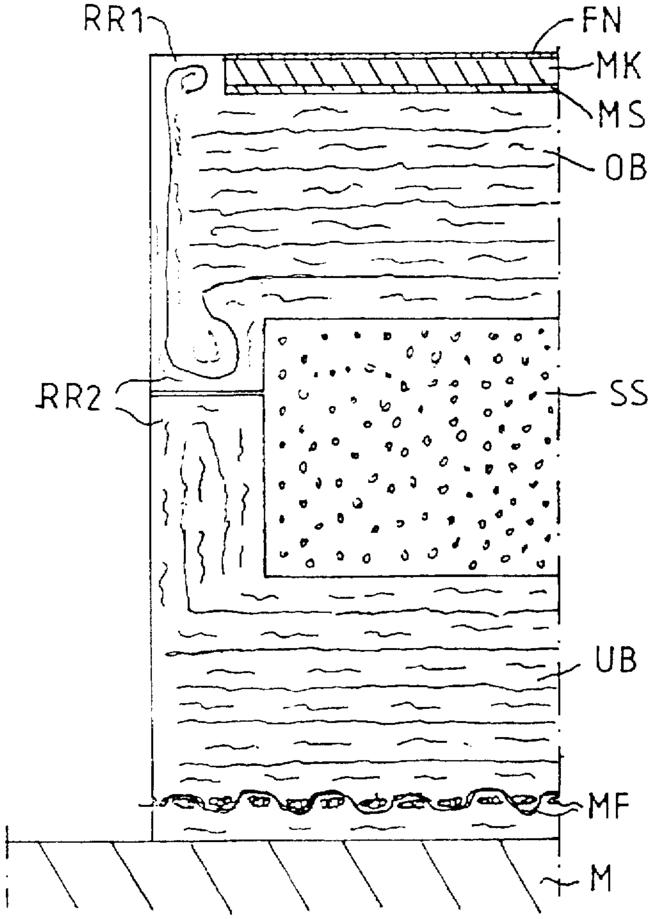
FIG. 2 is a cross-sectional view taken on a plane intersecting the axis of a roller, i.e., showing an enlarged axial cut at the front of the roller.

FIG. 2 shows an axial section of a roller end. The outer cover (OB) has a radially oriented annular rim (RR1), which tightly closes the metal-ceramic layer (MK) and, if required, the interlayer (MS) laterally.

In addition, the inner cover (UB) and/or the outer cover (OB) have a second annular rim (RR2), which laterally seal(s) the foamed material layer (SS).

Figure 3:
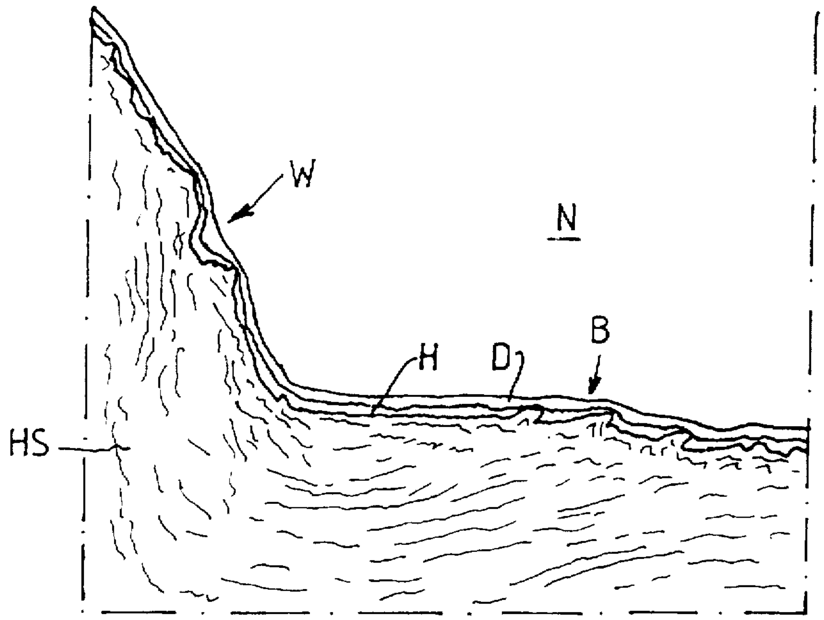
FIG. 3 is a section, enlarged 1000 times, through the microstructure below an impressed cup.

FIG. 3 shows a 1000-power enlargement of a small detail of the wall W and bottom B of a cup N, in which the microstructure, comprising a hard material HS, such as steel or the ceramic layer, is provided by means of doping in the micrometer range with an ion implant material H and a cover layer D above it. This view clearly shows that the microstructure of the hard material HS is very extensively destroyed by the mechanical machining, and has great roughness and porosity on its surface even though the surface was electrolytically polished prior to the ion implantation. The layer thicknesses of the implants H, D are shown with their heights exaggerated. In particular, the implanted oxide cover layer D is generally substantially thinner than the nitrified metal implantation H.

Figure 4:
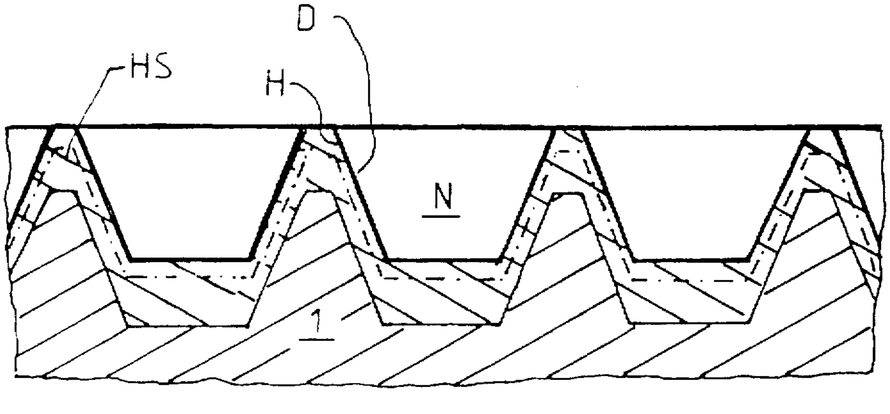
FIG. 4 is a highly enlarged section through a cup with a hard material and metal matrix coating.

FIG. 4 shows an enlarged cross section into the surface of the roller; in a known manner, the cups N with an oxidic hard material HS, comprise a nickel matrix with carbide inlay over which a hard chromium layer is applied. The chromium surface is then provided by the ion implantation with the implant material H and the cover layer D.

Figure 5:
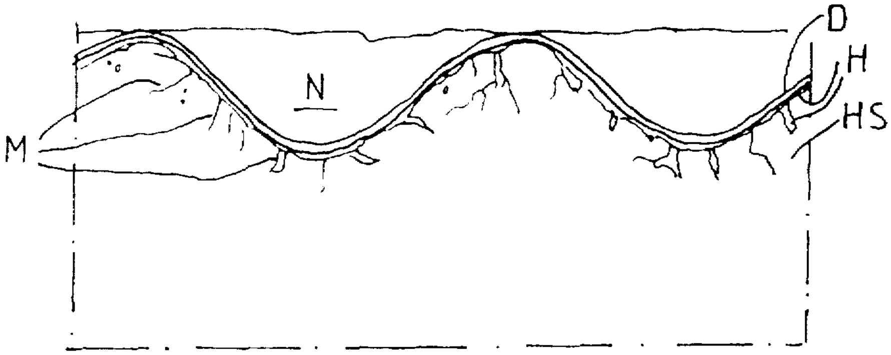
FIG. 5 shows a cross section enlarged 350 times.

FIG. 5 shows in a depth section, microscopic cracks or pores M extend into the solidified cup surface into a great depth relative to the cup structure. These microscopic cracks M are filled with the implant H. The cover layer D is shown over the implant H; in particular, it favorably affects the compatibility of the ink with the surface and lends it a predetermined adhesive strength relative to the printing ink. The thicknesses of the layers H and D are shown exaggerated.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An ink transfer roller cover for demountably covering a generally cylindrical roller surface and containing no class fibers at its surface, the roller cover comprising:

- a circumferentially stretchable inner plastic layer (UB), the inner plastic layer being proximal the roller surface when the roller cover is mounted to the roller surface;
- a foamed material compressible layer (SS) surrounding the inner plastic layer;
- an outer plastic layer (OB) including a synthetic-plastic fiber web stabilized synthetic resin material in contact with and surrounding the compressible layer, the synthetic resin material of the outer plastic layer including an elastic laminated synthetic resin material in which the fibers, having a thickness of approximately 0.5 mm, have been embedded as a plurality of synthetic resin web layers;
- a thin metal interlayer (MS) deposited on the outer plastic layer; and
- a metal ceramic layer deposited on the metal interlayer, the metal ceramic layer including a plurality of ink transfer cups.

2. The roller cover according to claim 1, wherein the ceramic layer includes nickel-silicon carbide.

3. The roller cover according to claim 1, wherein the inner plastic layer is between 2 and 7 mm thick, and wherein the compressible layer includes an elastic closed-cell foam selected from the group consisting of polyurethane foam, polypropylene foam, and polyamide foam, and wherein the compressible layer has a density between 0.3 to 0.7 g/cm$^3$, and wherein the compressible layer has a thickness of between 2 and 7 mm, and wherein the outer plastic layer has a thickness of between 2 to 7 mm.

4. The roller cover according to claim 1, wherein the outer plastic layer exerts a radial shrinking force on the compressible layer and on the inner plastic layer, whereby the roller cover is adhered to the roller surface.

5. The roller cover according to claim 1, wherein the outer plastic layer includes annular rims (RR1) projecting upwardly at opposing ends of the outer plastic layer to edge-seal the ceramic layer.

6. The roller cover according to claim 5, wherein at least one of the outer plastic layer and the inner plastic layer includes annular rims (RR2) disposed at opposing ends of the compressible layer to edge-seal the compressible layer.

7. The roller cover according to claim 5, wherein the metal ceramic layer includes chromium oxide and the metallic interlayer includes metal selected from the group consisting of aluminum, tin, nickel, and copper.

8. The roller cover according to claim 5, wherein the metal ceramic layer and the metallic interlayer are applied by high-pressure plasma-injection coating.

9. The roller cover according to claim 1, wherein the inner plastic layer, the compressible layer, and the outer plastic layer are extruded in one piece from laminated plastic material with a foamed center layer.

10. The roller cover according to claim 1, wherein superficial microscopic cracks (M) and pores in a surface of the metal ceramic layer with ink transfer cups are closed by means of an ion implant material applied with a high-voltage plasma.

11. The roller cover according to claim 10, wherein the ion implant material comprises a quadrivalent substance and at least one heavy metal.

12. The roller cover according to claim 11, wherein the ion implant material comprises titanium and molybdenum in a ratio of from 70/30 to 90/10.

13. The roller cover according to claim 10, wherein the ion implant material is lined by means of ion implantation on an outer side thereof with a wear-resistant thin cover layer (D) of a hard material selected from the group consisting of a metal oxide and a metal nitride, such that the cover layer (D) has a predetermined affinity for a printing ink to be metered with the printing roller.

14. The roller cover according to claim 13, wherein the cover layer (D) has a thickness of 0.05 to 1 μm.

15. The roller cover according to claim 13, wherein the cover layer (D) comprises zirconium oxide.

16. The roller cover according to claim 10, wherein the ceramic layer comprises ground and finished chromium oxide $Cr_2O_3$ in a thickness of from 100 to 150 μm, and cups (N) are made by laser engraving and finished, and subsequently the ion implant material is inserted such that the pores are closed.

17. The roller cover according to claim 10, wherein the ceramic layer includes metal-ceramic comprising a plasma-deposited nickel-chromium alloy in a ratio of approximately 80/20 by weight, approximately 100 μm thick.

* * * * *